UNITED STATES PATENT OFFICE.

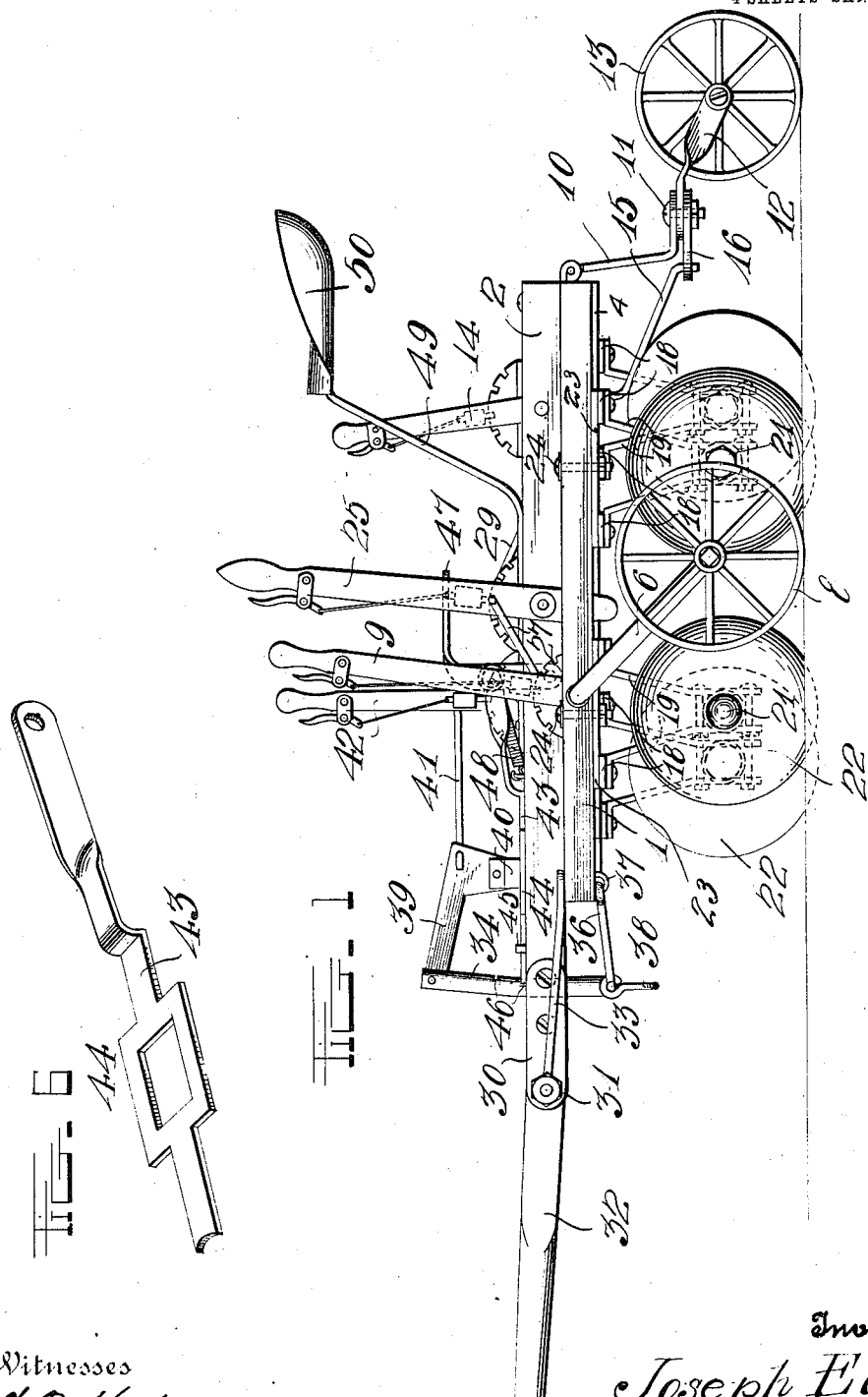

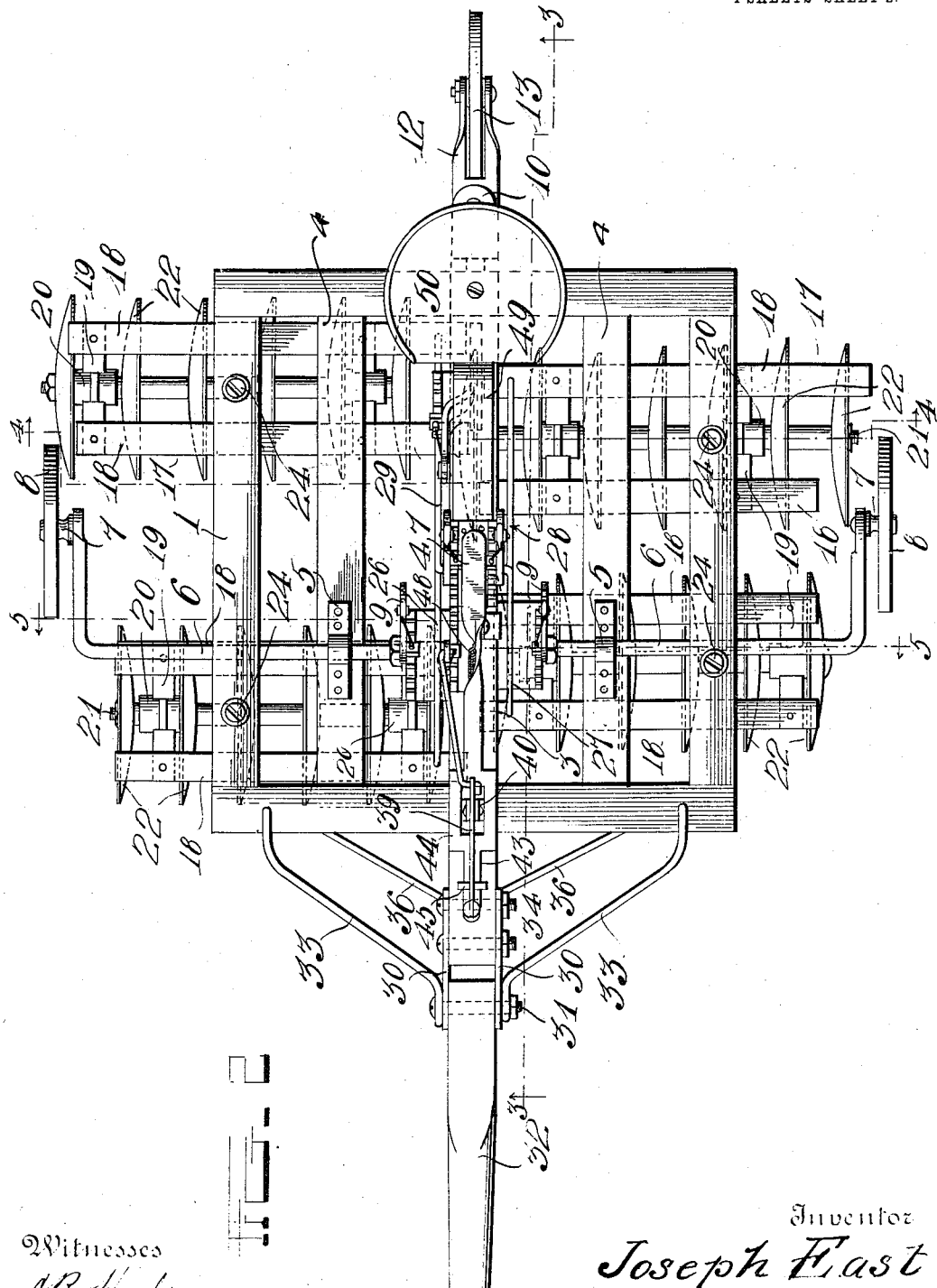

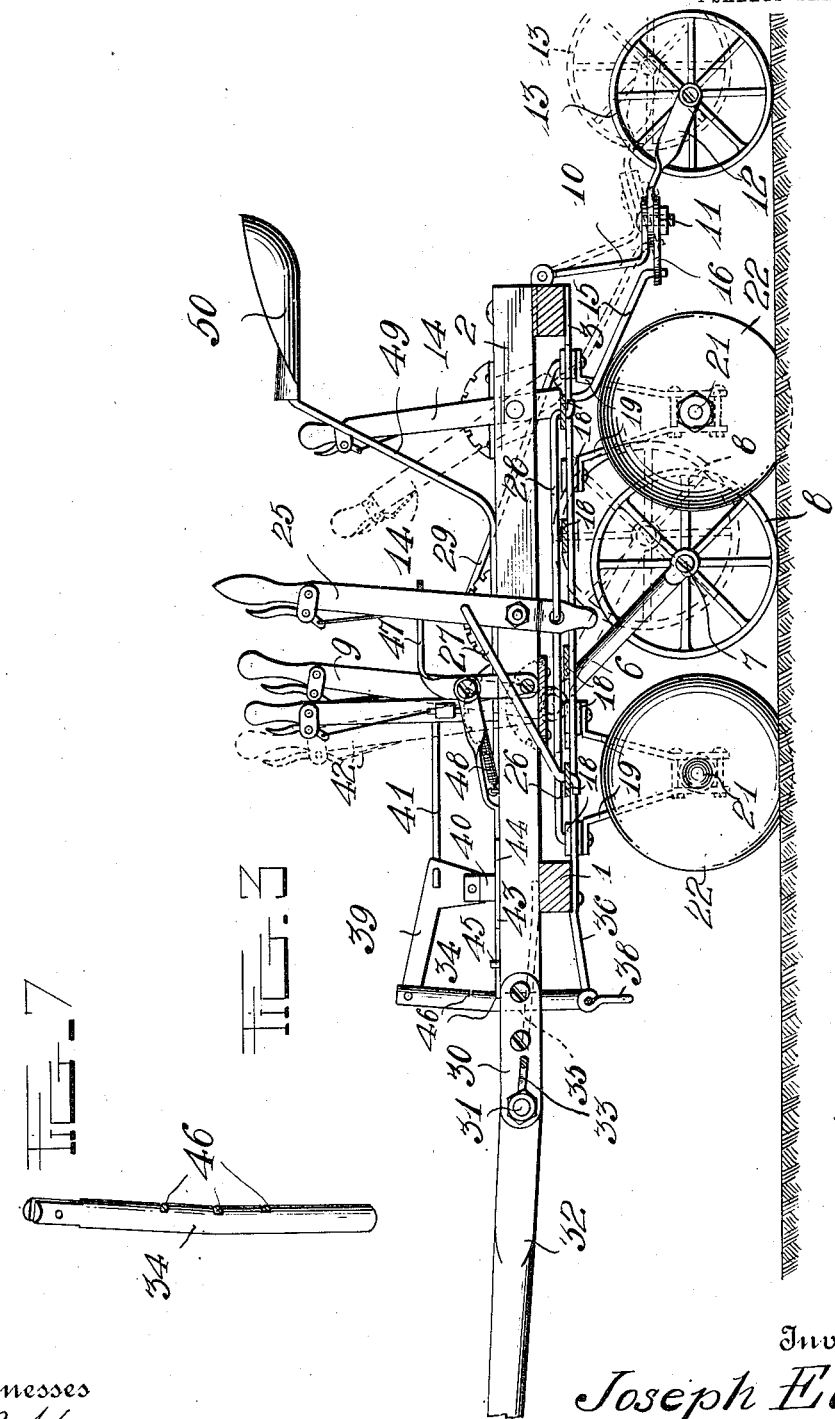

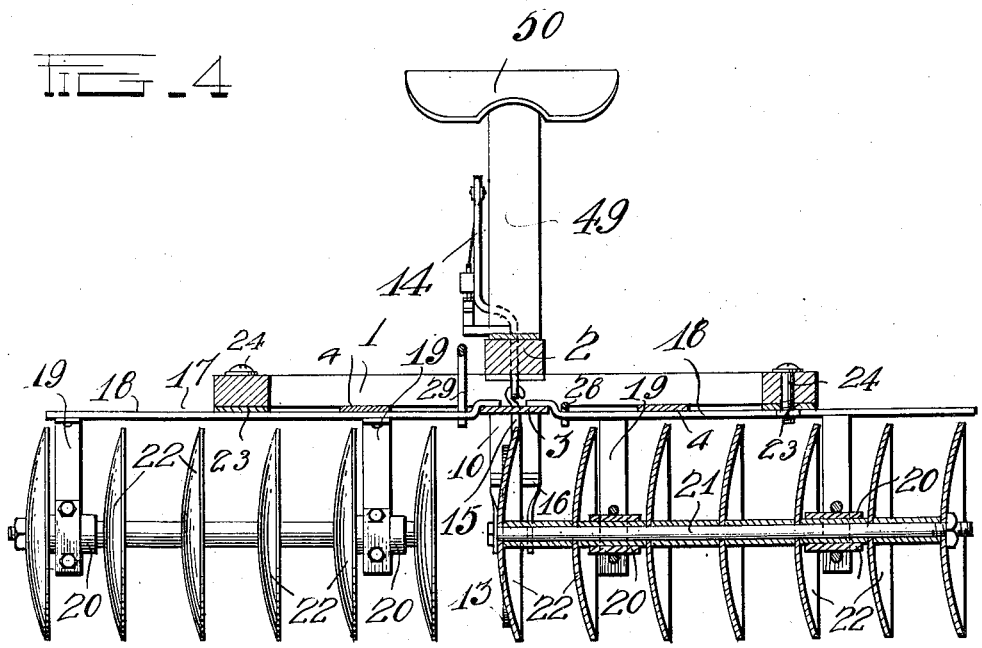
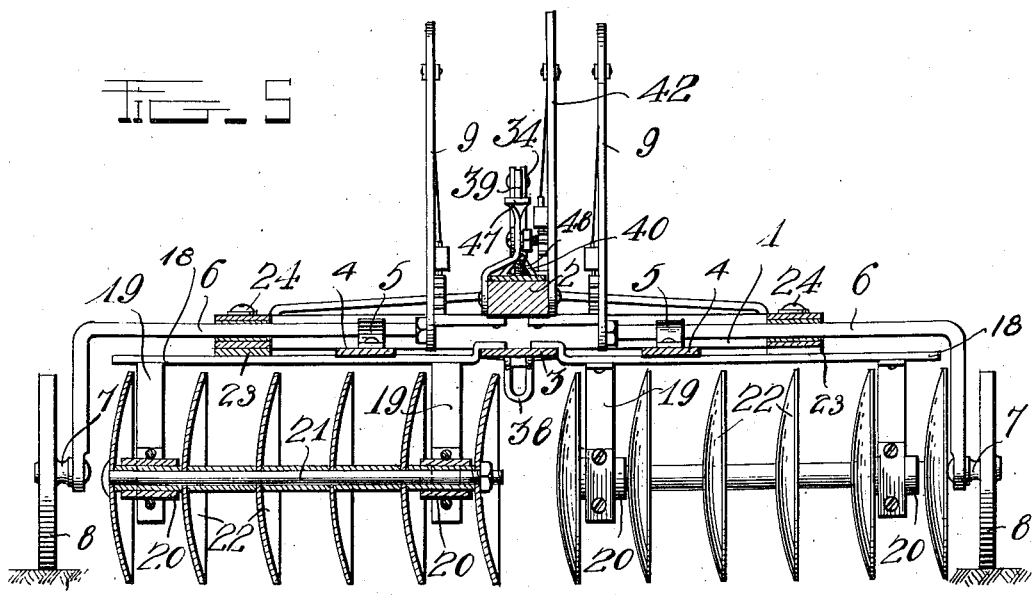

JOSEPH EAST, OF COLFAX, WASHINGTON.

DISK HARROW.

1,013,382.  Specification of Letters Patent.  Patented Jan. 2, 1912.

Application filed June 1, 1911. Serial No. 630,565.

*To all whom it may concern:*

Be it known that I, JOSEPH EAST, a citizen of the United States, residing at Colfax, in the county of Whitman and State of Washington, have invented certain new and useful Improvements in Disk Harrows; and I do declare the following to be a full, clear, and exact description of the invention, such as will enable others skilled in the art to which it appertains to make and use the same.

This invention is an improvement in disk harrows, its object being generally to improve the construction of the same as more specifically set forth in the following specification and shown in the drawings wherein—

Figure 1 is a side view of my improved harrow; Fig. 2 is a top plan view thereof; Fig. 3 is a vertical longitudinal section on the line 3—3 of Fig. 2; Fig. 4 is a vertical cross section on the line 4—4 of Fig. 2; Fig. 5 is a similar view on the line 5—5 of Fig. 2; Fig. 6 is a detail perspective view of the locking plate or pawl for holding the draft bar in its adjusted positions; Fig. 7 is a detail perspective view of the draft bar.

In the embodiment of the invention I provide a main supporting frame 1 which is preferably of rectangular form and has secured to its upper side a central longitudinally disposed reach bar 2 and to its lower side immediately below said reach bar is arranged a base plate 3. The frame 1 is further provided between the base plate 3 and the opposite side bars with longitudinally disposed bearing plates 4 carrying bearings 5 in which and in the side bars of the frame are revolubly mounted crank shafts 6 the outer ends of which project a suitable distance beyond the sides of the frame and are bent rearwardly at right angles to form cranks. On the lower ends of the cranked ends of the shafts are secured stub axles 7 on which are mounted the front raising and lowering and supporting wheels 8 of the cultivator. Fixedly secured to the inner ends of the shafts 6 are operating levers 9 by means of which the shafts are turned to bring the wheels 8 into and out of engagement with the ground and to thus raise and lower and support the cultivator at the desired elevation. The levers 9 are provided with any suitable form of pawl and ratchet locking mechanism whereby the same and the supporting wheels are held in their adjusted positions. Secured to the rear end of the frame is a centrally disposed caster wheel standard 10 said standard being in the form of a plate hingedly connected at its upper end to the rear end of the frame 1 so that it may rise and fall in a vertical plane and having on its lower end a right angularly formed and rearwardly extending pivot lug in which is mounted an upright pivot bolt 11 by means of which the frame 12 of a caster wheel 13 is pivotally connected to the standard so that it may swing from side to side. By thus connecting the caster wheel the latter is permitted to swing around freely on the standard. By hingedly connecting the standard to the frame as herein shown and described the latter may be swung upwardly and downwardly to engage the caster wheel with the ground and thereby elevate and support the machine or to swing said wheel out of engagement with the ground when desired. In order to thus operate the standard and wheel I provide an operating lever 14 which is pivotally mounted in the rear end of the reach bar and is connected at its lower end by a link or connecting rod 15 with a plate 16 secured to the lower end of the caster wheel standard by the bolt 11 whereby when said lever is rocked in one direction or the other the standard and wheel will be swung upwardly and downwardly to raise and lower the machine as hereinbefore described. The lever 14 is provided with any suitable form of pawl and ratchet locking mechanism whereby the same is locked to hold the caster wheel in its adjusted position.

Arranged in the opposite sides of the frame are two pairs of H-shaped harrow disk supporting frames 17, said frames comprising parallel horizontally disposed bars 18 to which near their opposite ends are secured depending hangers or bearing brackets 19 in the lower ends of which are arranged bearing boxes 20 in which are revolubly mounted the axles 21 of the harrow disks. One the axles 21 are fixedly mounted in any suitable manner series of harrow disks 22 which, when the machine is in operative position will engage the ground and thoroughly pulverize the soil. The bars 18 of the hanger frames are connected together intermediately of their ends by transverse connecting plates 23 which are pivotally secured below the side bars of the main frame 1 by pivot bolts 24 whereby said frames are adapted to be swung forwardly or rearwardly to different angles.

It will be noted that the harrow frames are connected to the main frame in such position that the harrow disks of one frame will be out of alinement with or disposed between the harrow disks of the other frame so that when in operation the entire surface of the ground will be worked. It will also be noted that one of the rear harrow frames is provided on its inner end with one more harrow disk than the other frames, said additional harrow disk being disposed in rear of the space between the inner ends of the two front frames.

In arranging the H-shaped harrow frames in the manner described the inner ends of the parallel bars 18 thereof will project under the bearing plate 4 and over the base plate 3, said plates thus forming guides for the inner ends of the frames. In order to turn the harrow frames to adjust the disks at the desired angles I provide an adjusting mechanism comprising levers 25 which are pivotally connected to the opposite sides of the reach bar 2. The lever 25 on one side of the reach bar has pivotally connected to its lower end or below its pivotal connection with the reach bar the inner end of a link 26 the outer end of which is connected to the inner end of the front harrow frame on this side of the machine, while the inner end of the front harrow frame on the opposite side of the machine is connected by a link 27 to the lever on this side of the reach bar above its pivotal connection with the latter. In the same manner the lever on one side of the reach bar is connected to the rear harrow frame on this side of the machine by an operating link 28 the inner end of which is connected to the lever below said pivotal connection with the reach bar, while the harrow frame on the opposite side of the machine is connected to the opposite lever by a link 29 at a point above the pivotal connection of the lever with the reach bar. By thus arranging the levers 25 and connecting the same with the harrow frame it will be seen that when the lever on one side of the reach bar is pushed forwardly the inner ends of the harrow frames on this side of the machine will be drawn together to a greater or less extent and the harrow frames thus adjusted at the desired angle. In the same manner the frames on the opposite side of the machine will be drawn together at their inner ends when the lever connected thereto is pulled rearwardly or in a reverse direction to the first mentioned lever. When said levers are swung in the opposite directions the frames will be reversed or brought back to their original positions.

The front end of the reach bar 2 projects a suitable distance beyond the front end of the frame 1 of the machine and is provided with parallel tongue attaching plates 30 through which is arranged a tongue connecting bolt 31 whereby the tongue 32 is hingedly and detachably secured to the machine. The front end of the reach bar is strengthened by diagonally arranged brace bars 33 the inner ends of which are connected to the front end bar of the frame and the outer end to the tongue connecting bolt 31. Also arranged in the front end of the reach bar and secured to the front end of the frame 1 is an adjustable draft connection whereby the draft animals may be hitched to the machine and the draft applied to throw either the front harrows or the rear harrows into the ground to a greater or less extent. The draft connection comprises a vertically disposed draft bar or bolt 34 which has a loose sliding engagement with a passage 35 formed in the outer end of the reach bar. The draft bar 34 is pivotally connected at its lower end to a brace rod 36 the inner ends of which are loosely connected to eyes 37 arranged on the lower side of the front cross bar of the main frame as shown. To the lower end of the draft bar and adjacent portions of the brace rod is secured a link or clevis 38 to which is adapted to be connected the whiffle tree or other draft device of the machine.

In order to adjust and hold the draft bar in its adjusted positions I provide a raising and lowering mechanism comprising a bell crank lever 39 one arm of which is pivotally connected to a bearing bracket 40 secured to the upper side of the reach bar 2. The opposite arm of the bell crank lever is pivotally connected to the upper end of the draft bar as shown. The bell crank lever 39 is connected by a link 41 to a hand or operating lever 42 which is pivotally connected at its lower end to one side of the reach bar. By thus arranging the parts the draft bar may be readily raised and lowered to the desired elevation by means of the operating lever 42. In order to hold the draft bar in its adjusted position I preferably provide a locking plate or pawl 43 which is arranged on and slidably engaged with the upper side of the reach bar, said pawl or plate having arranged therein a slotted enlargement 44 in which is disposed the bracket 40 of the bell crank lever. The outer end of the plate or pawl 43 is held in position by a guide loop 45 and is adapted to be engaged with a series of locking notches 46 formed in the inner side of the draft bar 44 whereby when said pawl is in a projected position the draft bar will be supported. The inner end of the locking pawl is pivotally connected to a foot lever 47 which is pivotally mounted on the reach bar 2 adjacent to the operating lever 42 whereby the lever 47 may be engaged by the foot of the driver and the locking plate or pawl 43 thus retracted to disengage the outer end thereof from the notches 46 in the draft bar after which the bell crank lever may be moved by the operating lever 42 thus raising or lowering the draft bar to the desired position. The locking pawl or plate 43 is preferably projected when released by the operator and held in a projected or operative position in engagement with the notches 46 by a coiled spring 48 which is connected to the lever 47 and adjacent portion of the reach bar as shown. Secured to the reach bar is a seat supporting standard 49 on the upper end of which is secured a seat 50 said seat being arranged in such position that the driver may readily reach the various operating levers herein described.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention what I claim is:

In a harrow of the character described, the combination with a main supporting frame including a central longitudinal reach bar, a base plate beneath said bar, and longitudinal bearing plates at either side of and parallel with said base plate; of four H-shaped harrow-frames, each comprising longitudinal parallel bars and a transverse connecting plate, bearing brackets depending from the frame, disks whose axles are mounted in said brackets, the connecting plate of each frame being pivoted beneath the side bar of the main supporting frame and its parallel bars extending at their inner portions slidably under said bearing plate and then slidably over said base plate; and levers, and link mechanisms connecting them with the four harrow-frames for adjusting the position of the latter beneath the main frame.

In testimony whereof I have hereunto set my hand in presence of two subscribing witnesses.

JOSEPH EAST.

Witnesses:
 J. A. PERKINS,
 EDWIN C. BAIRD.